United States Patent

Takata et al.

[11] Patent Number: 5,145,267
[45] Date of Patent: Sep. 8, 1992

[54] AUTOMATIC CENTER ADJUSTING ROLLER BEARING

[75] Inventors: Hirotoshi Takata, Yokohama; Susumu Suzuki, Minami-ashigara, both of Japan

[73] Assignee: Nippon Seiko Kabushiki Kaisha, Tokyo, Japan

[21] Appl. No.: 711,161

[22] Filed: Jun. 5, 1991

[30] Foreign Application Priority Data

Jun. 6, 1990 [JP] Japan .................. 2-147656

[51] Int. Cl.⁵ .................................. F16C 33/58
[52] U.S. Cl. .................... 384/558; 384/565; 384/569
[58] Field of Search .......... 384/558, 565, 569, 450, 384/495, 516

[56] References Cited

U.S. PATENT DOCUMENTS

| | | | |
|---|---|---|---|
| 4,828,404 | 5/1989 | Takata | 384/569 |
| 4,893,387 | 1/1990 | Akamatsu et al. | 384/450 |
| 5,007,747 | 4/1991 | Takeuchi et al. | 384/568 |
| 5,009,524 | 4/1991 | Dittenhoefer | 384/558 |

Primary Examiner—Lenard A. Footland
Attorney, Agent, or Firm—Basile and Hanlon

[57] ABSTRACT

In a double row automatic center adjusting roller bearing at least one of the raceway surfaces of an inner race and an outer race and a rolling surface of a roller is worked to have different surface roughnesses along the axial direction of the roller bearing. For the inner race having a pair of inner raceway surfaces, in each inner raceway surface, a contact surface portion which is in contact with the rollers at a bearing center side is formed to have smaller surface roughness than that of a contact surface portion which is in contact with the rollers at a bearing side surface side to thereby prevent the generation of a large negative skew angle of the roller.

4 Claims, 1 Drawing Sheet

AUTOMATIC CENTER ADJUSTING ROLLER BEARING

BACKGROUND OF THE INVENTION

1. Field of the Invention:

The present invention relates to an automatic center adjusting roller bearing.

2. Description of the Art:

It has been known that, during operation of an automatic center adjusting roller bearing, when rollers do not roll normally, for example, when the rollers roll with a large skew angle, an inconvenience such as an increase of friction and heat generation in the inside of the bearing is caused which results in a reduction of the rolling fatigue life of the bearing.

For this reason, various techniques for controlling the skew angle of the bearing during operation have been developed. For example, raceway surfaces of an inner race and an outer race respectively are made to have different shapes of generating lines and to have different radii of curvature. Alternately, relative surface roughness between the raceway surface of the inner race or outer race and the rolling surface of the roller are made different from each other.

However, the measure to use the inner race and the outer race having raceway surfaces of different generating line shapes and different radii of curvature requires the combination of the inner race and the outer race having very complicated shapes of generating lines and radii of curvature. Further, in the measure to use the inner race, the outer race, and the rollers in which the relative surface roughness between the raceway surfaces of the inner race and the outer race and the rolling surfaces of the rollers are different, it is necessary to take the relationship with a counterpart component into consideration. As a result, it is practically difficult to effectively manufacture a bearing to control the skew. Furthermore, since various factors such as the shape of the generating lines of the raceway surfaces of the inner and outer races, the surface roughness of these raceways and the roller rolling surface, and the like, affect the skew of the rollers in combination, there factors must be determined from the point of overall consideration. Accordingly, freedom in the design of the bearing is restricted to a great extent.

SUMMARY OF THE INVENTION

It is an object of the present invention to provide an automatic center adjusting roller bearing which enables the easy control of an excessively large negative skew of the rollers.

In an automatic center adjusting roller bearing in the present invention, in at least one of an inner raceway surface, an outer raceway surface, and a roller rolling surface, the surface roughness of a portion at a bearing center side is made different from the surface roughness of a portion at a bearing side surface side.

As to the inner raceway surface, in a contact surface with the roller, the surface roughness of a portion at the bearing center side which contacts the roller is made smaller than the surface roughness of a portion at the bearing side surface side which contacts the roller other than the above-mentioned portion.

As to the outer raceway surface, in a contact surface with the roller, the surface roughness of a portion at the bearing side surface side which is in contact with the roller is made smaller than the surface roughness of a portion of at least the bearing center which contacts the roller other than the above-mentioned portion.

As to the surface roughness of the roller rolling surface, in the case wherein the surface roughness of the inner raceway is different from the surface roughness of the outer raceway, when the inner raceway has a larger surface roughness than that of the outer raceway, the surface roughness of a portion at the bearing center side with which portion the outer race and the inner race are in contact is made smaller than that of a portion at the bearing side surface side with which portion the outer race and the inner race are in contact. On the other hand, when the inner raceway has a smaller surface roughness than that of the outer raceway, the surface roughness of a portion at the bearing side surface side with which portion the outer race and the inner race are in contact is made smaller than that of a portion at the bearing center side with which portion the outer race and the inner race are in contact.

In the automatic center adjusting roller bearing of the present invention, at least one surface of the inner raceway surface, the outer raceway surface, and the roller rolling surface is made to have a different surface roughness along its surface. As to the inner raceway surface, in the contact surface with the roller, a contact surface portion at the bearing center side or a contact surface portion at the bearing side surface side is made to have a smaller surface roughness than that of the rest of the contact surface portion. As to the roller rolling surface, a contact surface portion with the inner race and the outer race at the bearing center side or a contact surface portion with the inner race and the outer race at the bearing side surface side is made to have a smaller surface roughness than that of the rest of the contact surface portion. As a result, a frictional force between the raceway surface and the roller at the contact surface portion having the smaller surface roughness is decreased to a smaller value than a frictional force at the rest of the contact surface portion. Thus, the moment is changed to reduce the large negative skew of the roller.

DESCRIPTION OF THE PREFERRED EMBODIMENTS

Figure 1:
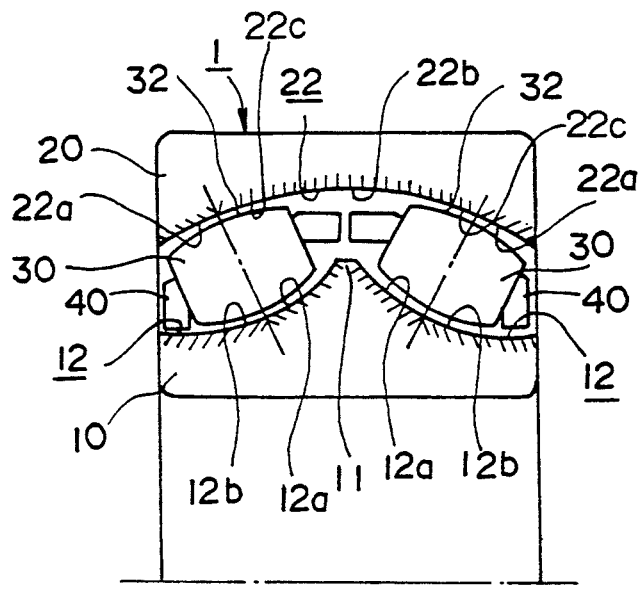
FIG. 1 is a longitudinal cross sectional view of the upper half of a double row automatic center adjusting roller bearing showing an embodiment in which the present invention is applied to an inner race and an outer race of the bearing.

With reference to FIG. 1, a double row automatic center adjusting roller bearing 1 includes an inner race 10, an outer race 20, rollers 30 rollably assembled between the inner race 10 and the outer race 20 in a double row, and retainers 40 for holding and guiding the rollers 30.

The inner race 10 has a pair of raceway surfaces 12 of a concave spherical shape formed at both sides of a center rib 11 so that the raceway surfaces 12 have angles inclined axially outwardly and downwardly with respect to a bearing center axis. The outer race 20 has a raceway surface 22 of a concave spherical shape having a uniform radius of curvature. The rollers 30 are so-called spherical surface rollers having a rolling surface 32 of a convex spherical shape.

In the inner race 10 of the bearing the raceway surface 12 has different surface roughnesses along an axial direction of the bearing 1. Specifically, in a contact surface with the roller 30, the roughness of a contact surface portion at a bearing center side or near the bearing center is different from the roughness of the rest of the contact surface. Namely, a contact surface portion 12a which is in contact with the roller 30 at the bearing center side has a smaller surface roughness than that of the rest of the raceway surface 12 including a contact surface portion 12b which is in contact with the roller 30 at a bearing side surface side.

Similarly, as to the raceway surface 22 of the outer race 20 of the bearing 1, the raceway surface 22 includes two contact surfaces respectively with the pair of rollers 30 and, in each contact surface with each roller 30, the surface roughness is made different along the axial direction. Namely, a contact surface portion 22a which is in contact with the roller 30 at a bearing side surface side has a smaller surface roughness than that of a center portion 22b which includes a non-contact surface portion and a contact surface portion 22c which is in contact with the roller 30 at the bearing center side. In this case, the surface roughness of the contact surface portion 22a with the roller 30 at the bearing side surface side may be made smaller than that of only the contact surface portion 22c with the roller 30 at the bearing center side and the surface roughness of the contact surface portion 22c with the roller 30 at the bearing center side may be made different from the surface roughness of the non-contact surface portion.

The degree of difference (a reduction rate) between the surface roughnesses of the contact surface portions in the inner raceway surface and the outer raceway surface mentioned above and a boundary area between the contact surface portions having respectively different surface roughnesses is suitably determined depending on design factors and the working conditions of the particular bearing.

In the above case, a rolling surface 32 of the roller 30 of the bearing 1 mentioned above is formed to have a uniform surface roughness over the whole surface.

Figure 2:
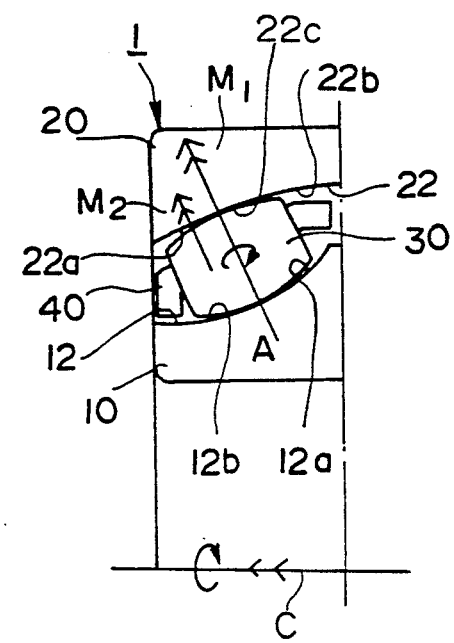
FIG. 2 is a diagram explaining the operating condition of a negative skew.

The operation of the automatic center adjusting roller bearing 1 structured as described above will now be described with reference to FIG. 2.

It is assumed that the surface roughness of a contact surface portion 12a which is in contact with a roller 30 at a bearing center side of an inner raceway 12 is formed equal to the surface roughness of a contact surface portion 12b which is in contact with the roller 30 at a bearing side surface side and, further, the surface roughness of a contact surface portion 22a which is in contact with the roller 30 at a bearing side surface side of an outer raceway surface 22 is formed equal to the surface roughness of a center portion 22b including a contact surface portion 22c which is in contact with the roller 30 at the bearing center side as in the prior art bearing. When the inner race 10 of this bearing rotates in the direction as shown by the arrow C, a large negative skew will be generated in the roller 30. In the roller 30, due to a negative skew moment M1 acting about a center axis, a force is imparted onto the roller 30 causing the roller 30 to roll to the bearing side surface side with respect to the inner raceway surface 12. As a result, friction and generation of heat are increased.

In the present invention, in the inner raceway surface 12, the contact surface portion 12a which is in contact with the roller 30 at the bearing center side has a smaller surface roughness than that of the contact surface portion 12b which is in contact with the roller 30 at the bearing side surface side. Further, in the outer raceway surface 22, the contact surface portion 22a which is in contact with the roller 30 at the bearing side surface side has a smaller surface roughness than that of the center portion 22b including the contact surface portion 22c which is in contact with the roller 30 at the bearing center side. As a result, among the contact surface portions of the inner raceway surface 12 and the outer raceway surface 22 with the roller 30, in the contact surface portions 12a and 22a having the smaller surface roughness, an oil film is more easily formed as compared with the other portions 12b and 22b which have the larger surface roughness. Accordingly, the frictional force due to the contact with the rolling surface 32 of the roller 30 is reduced. This reduction of the frictional force acts on the roller 30 in a direction to reduce the skew moment M1 which tends to cause a large skew. Moreover, since the degree of reduction of the frictional force is varied in the axial direction in accordance with the change in the roughness of the raceway surfaces in the axial direction, it appears as if the center axis of the skew moment M1 was moved to the bearing side surface side away from a center axis A of the roller 30. At the same time, the value of the skew moment M1 is reduced to M2. Accordingly, the large negative skew of the roller 30 is reduced by being suppressed or disappears altogether.

In the present invention, other than the case of the above embodiment in which the surface roughness is made different in both the inner raceway surface 12 and the outer raceway surface 22, any one of the inner raceway surface 12 and the outer raceway surface 22 may be formed to have a different surface roughness. Also, in this case, a similar effect can be obtained.

Figure 3:
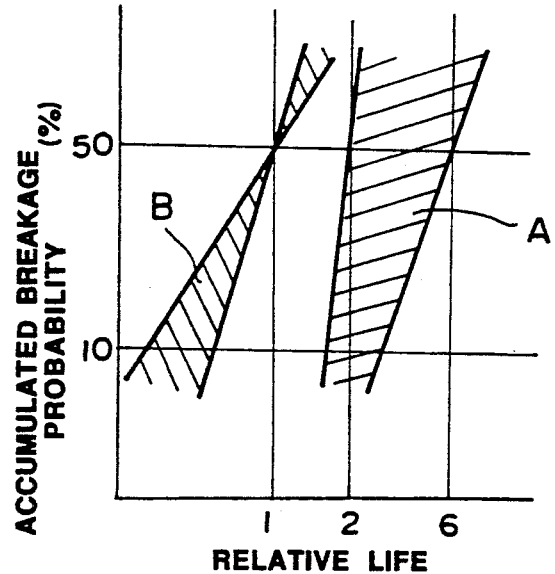
FIG. 3 is a graph showing the results of a life test.

FIG. 3 shows a result of a life evaluation test conducted on the bearing of the present invention and on a prior art bearing.

In this test, three types of bearings of the present invention and the three types of bearings of the prior art were tested, with a total of 15 bearings being involved in the test.

In the bearings of the present invention, the inner raceway surface 12 is formed so that the contact surface portion 12a at the bearing center side has a surface roughness ½ of the surface roughness of the contact surface portion 12b at the bearing side surface side. In the prior art bearings, the inner raceway surface is formed so that the surface roughness of the whole surface is equal to the surface roughness of the contact surface portion 12b at the bearing side surface side in the inner raceway surface 12 of the bearings. In the bearings of the present invention and the bearings of the prior art, the surface roughness of the outer raceway surfaces are made equal to each other. Furthermore, the surface roughness of the roller and the retainer is the same in both of the bearings of the present invention and the bearings of the prior art.

With reference to FIG. 3, the hatched portion A represents the bearings of the present invention and the hatched portion B represents the bearings of the prior art. The rolling fatigue life (50% rated life) of the prior art bearings is represented as "1".

As will be apparent from FIG. 3, the bearings of the present invention have a life 2 to 6 times longer than the bearings of the prior art.

Furthermore, in the above test, according to an investigation of a negative skew angle of a roller in each bearing, the negative skew angle of the roller in the bearings of the present invention is decreased to about ½ that of the bearings of the prior art. When comparing values of temperature rise between the bearings of the present invention and the bearings of the prior art, the temperature rise value in the bearings of the present invention was reduced by about 20% as compared with the bearings of the prior art. It was also ascertained that heat generation due to the friction of the bearing could be suppressed.

Figure 4:
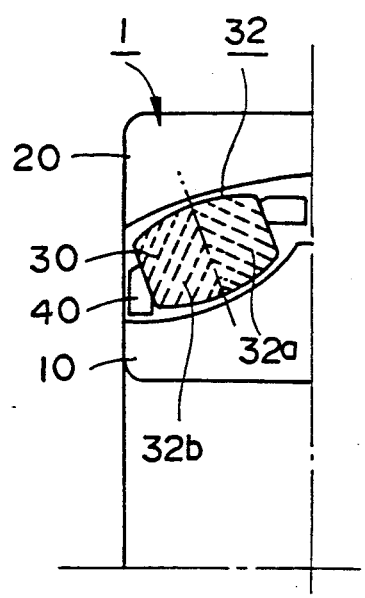
FIG. 4 is a longitudinal cross sectional view of the upper half of a double row automatic center adjusting roller bearings showing another embodiment in which the present invention is applied to a roller of the bearing.

With reference to FIG. 4, another embodiment will be described in which the present invention is applied to a roller of a double row automatic center adjusting roller bearing.

Since the structure of the double row automatic center adjusting roller bearing 1 is the same as that shown in FIG. 1, the description thereof is omitted As to the surface roughness of the rolling surface 32 of the roller 30, the surface roughness of a portion at the bearing center side is made different from that of a portion at the bearing side surface side in accordance with a relationship with the surface roughnesses of the inner raceway surface 12 and the outer raceway surface 22.

First, in the case wherein the inner raceway surface 12 is formed to have a larger surface roughness than that of the outer raceway surface 22, in the roller rolling surface 32, a portion 32a which is in contact with the inner race 10 and the outer race 20 at the bearing center side is formed to have a smaller surface roughness than that of a portion 32b which is in contact with the inner race 10 and the outer race 20 at the bearing side surface side.

In contrast, when the inner raceway surface 12 is formed to have a smaller surface roughness than that of the outer raceway surface 22, in the roller rolling surface 32, the portion 32b which is in contact with the inner race 10 and the outer race 20 at the bearing side surface side is formed to have a smaller surface roughness than that of the portion 32a which is in contact with the inner race 10 and the outer race 20 at the bearing center side.

The degree of difference (a reduction rate) between the surface roughnesses of the roller rolling surface 32 mentioned above and a boundary area between the contact surface portions having respectively different surface roughnesses are suitably determined depending on design factors and the working conditions of the particular bearing.

The operation of the automatic center adjusting roller bearing structured as mentioned above is the same as the aforementioned case in which the surface roughness is made different between the contact portions 12a and 12b at the bearing center side and the bearing side surface side, respectively, of the inner raceway surface 12 and the case in which the surface roughness is made different between the contact portions 22a and 22b at the bearing side surface side and the bearing center side, respectively, of the outer raceway surface 22.

Furthermore, in the present invention, at least two of the inner raceway surface 12, the outer raceway surface 22, and the roller rolling surface 32 may be combined.

As described in the foregoing, in the present invention, the contact surface portion which is in contact with the roller at the bearing center side of the inner raceway surface is formed to have a smaller surface roughness than that of the rest of the inner raceway surface, the contact surface portion which is in contact with the roller at the bearing side surface portion of the outer raceway surface is formed to have a smaller surface roughness than that of the rest of the outer raceway surface, and the contact surface portion which is in contact with the inner race and the outer race at the bearing center side or at the bearing side surface side of the roller rolling surface is formed to have a smaller surface roughness than that of the rest of the roller rolling surface. Owing to this simple work, it is possible to prevent a large negative skew from being generated. As a result, an advantage is provided in that the friction and the generation of heat are suppressed and an automatic center adjusting roller bearing having a long rolling fatigue life can be achieved.

Furthermore, the present invention can be implemented by a normal surface work without requiring a change of the shape of the generating line of the inner race and the outer race of the bearing, and without requiring a change of the design factors, such as a radius of curvature, and the like. In addition, the selection of an object part to be worked and the setting of a working area can be determined arbitrarily. As a result, the freedom of the design of the bearing is not limited and the automatic center adjusting roller bearing of the present invention can exhibit an optimum performance in a wide range of uses.

What is claimed is:

1. In an automatic center adjusting roller bearing comprising an inner race, an outer race, and rollers rollably assembled between the inner race and the outer race in a double row, the improvement comprising:
    a contact surface portion of an inner raceway surface of the inner race disposed in contact with the rollers at a bearing center side having a surface roughness smaller than the surface roughness of the rest of the inner raceway surface including a contact surface portion which is in contact with the rollers at a bearing side surface side.

2. In an automatic center adjusting roller bearing comprising an inner race, an outer race, and rollers rollably assembled between the inner race and the outer race in a double row, the improvement comprising:
    a contact surface portion of an outer raceway surface of the outer race disposed in contact with the rollers at a bearing side surface side having a surface roughness smaller than the surface roughness of the rest of the outer raceway surface including a contact surface portion which is in contact with the rollers at a bearing center side.

3. In an automatic center adjusting roller bearing comprising an inner race, an outer race, and rollers rollably assembled between the inner race and the outer race in a double row, the improvement comprising
    an inner raceway surface of the inner race having a larger surface roughness than the surface roughness of an outer raceway surface of the outer race, and
    a contact portion of a rolling surface of the rollers disposed in contact with the inner race and the outer race at a bearing center side having a smaller surface roughness than the surface roughness of the rest of the rolling surface including a contact portion which is in contact with the inner race and the outer race at a bearing side surface side.

4. In an automatic center adjusting roller bearing comprising an inner race, an outer race, and rollers rollably assembled between the inner race and the outer race in a double row, the improvement comprising:

an inner raceway surface of the inner race having a smaller surface roughness than the surface roughness of an outer raceway surface of the outer race, and a contact portion of a rolling surface of the rollers disposed in contact with the inner race and the outer race at a bearing side surface side having a smaller surface roughness than the surface roughness of the rest of the rolling surface including a contact portion which is in contact with the inner race and the outer race at a bearing center side.

* * * * *